(12) United States Patent
Kakiuchi et al.

(10) Patent No.: US 9,197,120 B2
(45) Date of Patent: Nov. 24, 2015

(54) LINEAR ACTUATOR

(75) Inventors: Takashi Kakiuchi, Sagamihara (JP);
Kousuke Satou, Sagamihara (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 440 days.

(21) Appl. No.: 13/822,563

(22) PCT Filed: Sep. 8, 2011

(86) PCT No.: PCT/JP2011/070504
§ 371 (c)(1),
(2), (4) Date: Mar. 12, 2013

(87) PCT Pub. No.: WO2012/039293
PCT Pub. Date: Mar. 29, 2012

(65) Prior Publication Data
US 2013/0175887 A1 Jul. 11, 2013

(30) Foreign Application Priority Data

Sep. 21, 2010 (JP) ................................. 2010-210453

(51) Int. Cl.
*F16K 15/03* (2006.01)
*H02K 41/02* (2006.01)
(Continued)

(52) U.S. Cl.
CPC ................ *H02K 41/02* (2013.01); *F16F 15/03* (2013.01); *H02K 41/031* (2013.01); *H02K 5/10* (2013.01); *H02K 7/08* (2013.01); *H02K 11/0021* (2013.01)

(58) Field of Classification Search
CPC ......... H02K 9/19; H02K 41/02; H02K 41/03; F16F 15/03

USPC .......... 310/12.04, 12.33, 12.01, 12.09, 12.31; 267/140.14, 140.15, 140.13; 188/267; 212/331; 254/362

See application file for complete search history.

(56) References Cited

U.S. PATENT DOCUMENTS 5,263,558 A * 11/1993 Yamaoka ...................... 188/267
5,947,238 A * 9/1999 Jolly et al. .................. 188/267.2
(Continued)

FOREIGN PATENT DOCUMENTS

| JP | 2000-078828 A | 3/2000 |
|---|---|---|
| JP | 2003-211088 A | 7/2003 |

(Continued)

OTHER PUBLICATIONS

International Search Report and Written Opinion Corresponding to PCT/JP2012/070504, dated Dec. 6, 2011.
(Continued)

*Primary Examiner* — Burton Mullins
(74) *Attorney, Agent, or Firm* — Hauptman Ham, LLP

(57) ABSTRACT

A linear actuator is provided with an outer tube and an inner tube inserted in the outer tube so as to be free to slide. The linear actuator is also provided with a rod erected at a central axis part of the inner tube and forming an annular space between the rod and the inner tube, a rod guide provided at an extreme end of the rod in sliding contact with an inner surface of the outer tube, a plurality of permanent magnets arranged along an axial direction in the rod, and a plurality of coils retained by the outer tube so as to face the permanent magnets. A cross-sectional area of an outer periphery of the inner tube along which the outer tube slides and a cross-sectional area of an inner periphery of the outer tube along which the rod guide slides are set to be equal.

7 Claims, 2 Drawing Sheets

(51) Int. Cl.
*F16F 15/03* (2006.01)
*H02K 41/03* (2006.01)
*H02K 5/10* (2006.01)
*H02K 7/08* (2006.01)
*H02K 11/00* (2006.01)

(56) References Cited

U.S. PATENT DOCUMENTS

| | | | |
|---|---|---|---|
| 6,354,607 B1* | 3/2002 | Kawashima et al. | 280/5.511 |
| 7,913,822 B2* | 3/2011 | Haney et al. | 188/284 |
| 2003/0164647 A1 | 9/2003 | Kobayashi et al. | |
| 2006/0181158 A1* | 8/2006 | Tajima et al. | 310/12 |
| 2008/0079522 A1* | 4/2008 | Okada et al. | 335/229 |
| 2010/0171459 A1 | 7/2010 | Aso et al. | |
| 2013/0127175 A1* | 5/2013 | Zuo et al. | 290/1 A |

FOREIGN PATENT DOCUMENTS

| | | |
|---|---|---|
| JP | 2004-053003 A | 2/2004 |
| JP | 2007-274820 A | 10/2007 |
| JP | 2007-274820 A1 | 10/2007 |
| JP | 2010-104089 A | 5/2010 |
| JP | 2010-104091 A | 5/2010 |

OTHER PUBLICATIONS

International Search Report and Written Opinion corresponding to PCT/JP2011/070504, dated Dec. 6, 2011.

* cited by examiner

LINEAR ACTUATOR

TECHNICAL FIELD

This invention relates to a linear actuator.

BACKGROUND ART

JP2007-274820A published by the Japan Patent Office proposes a linear actuator provided with a cylindrical tube having a closed end, a cylindrical yoke retaining permanent magnets arranged along an axial direction on an outer peripheral surface, and a plurality of coils disposed on an inner surface of the tube. This linear actuator is designed to drive the yoke in the axial direction relative to the tube.

The linear actuator of JP2007-274820A is also provided with a rod which is disposed in a bottom portion of the tube and can be moved forward into and backward from the yoke, a bearing disposed at an extreme end of the rod in sliding contact with an inner surface of the yoke, and a bearing disposed on the inner surface of the yoke in sliding contact with an outer peripheral surface of the rod. With these two bearings serving to guide the moving yoke, the linear actuator is configured to extend and contract smoothly.

At a proximal end of the yoke, there is provided a cylindrical protective cover having a closed end, the protective cover covering an open end of the tube. On an inner surface of an open end portion of the protective cover, there is provided a dust seal which slides along an outer peripheral surface of the tube. This dust seal prevents such foreign matter as dust, dirt and drops of water from entering an internal space of the linear actuator. In the linear actuator of JP2007-274820A, the internal space thereof is sealed by the dust seal as mentioned above.

SUMMARY OF INVENTION

In the linear actuator of JP2007-274820A, an internal volumetric capacity thereof varies as a result of extension and contraction. Particularly, when the internal volumetric capacity increases due to extension, an internal pressure of the linear actuator becomes low relative to an external pressure thereof, and a gap may be formed between the dust seal and the tube. This gap may allow foreign matter to intrude into the internal space.

It is therefore an object of this invention to prevent intrusion of foreign matter into the internal space of the linear actuator.

To achieve the object described above, a linear actuator includes an outer tube and an inner tube inserted in the outer tube, the linear actuator generating a thrust for relatively displacing the outer tube and the inner tube along an axial direction. The linear actuator further includes a rod erected at a central axis part of the inner tube and forming an annular space between the rod and the inner tube a rod guide provided at an extreme end of the rod in sliding contact with an inner surface of the outer tube, a plurality of permanent magnets arranged along the axial direction in the rod, and a plurality of coils retained by the outer tube so as to face the permanent magnets. A cross-sectional area of an outer periphery of the inner tube along which the outer tube slides and a cross-sectional area of an inner periphery of the outer tube along which the rod guide slides are set to be equal.

The details as well as other features and advantages of this invention are set forth in the remainder of the specification and are shown in the accompanying drawings.

DESCRIPTION OF EMBODIMENTS

A linear actuator 1 according to an embodiment of this invention is will be described with reference to the drawings.

Figure 1:
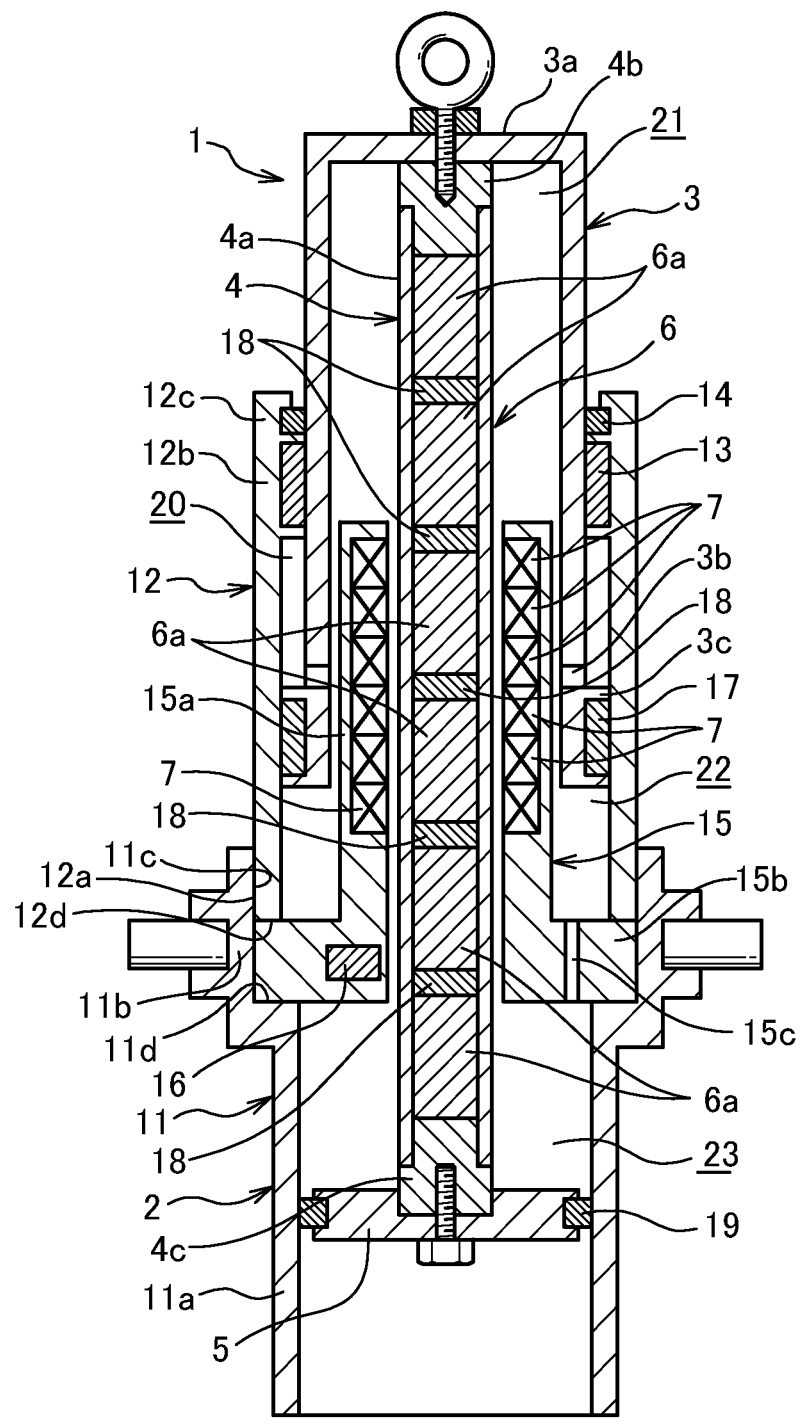
FIG. 1 is a longitudinal cross-sectional view of a linear actuator according to an embodiment of this invention.
Figure 2:
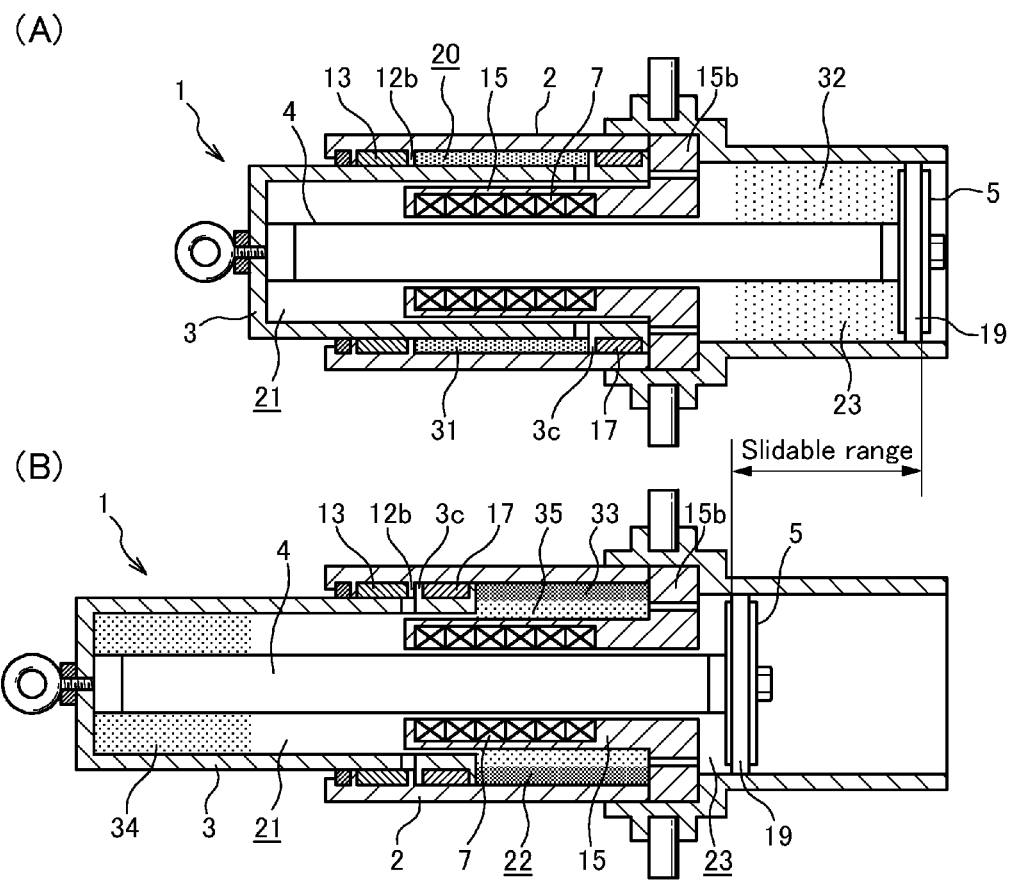
FIG. 2 is a longitudinal cross-sectional view of the linear actuator according to the embodiment of this invention showing a state in which the linear actuator is most extended and a state in which the linear actuator is most contracted.

Referring to FIG. 1 and FIG. 2, the configuration of the linear actuator 1 will be described.

The linear actuator 1 is provided with a cylindrical outer tube 2, an inner tube 3 formed into a cylindrical shape having a closed end and an open end portion which can be displaced axially in the outer tube 2, a rod 4 having a proximal end joined to a bottom portion 3a of the inner tube 3 and an extreme end projecting from the inner tube 3, and a rod guide 5 provided at the extreme end of the rod 4 in sliding contact with an inner surface of the outer tube 2. The linear actuator 1 is also provided with a magnetic field generator 6 having a plurality of permanent magnets 6a retained on the inside of the rod 4, a plurality of coils 7 which are so arranged as to face an outer peripheral surface of the magnetic field generator 6, and a cylindrical coil holder 15 retaining the coils 7 on an inner surface, an outer peripheral surface of the coil holder 15 being fixed to the outer tube 2. The linear actuator 1 is a device which generates a thrust for relatively displacing the outer tube 2 and the inner tube 3 along the axial direction according to a magnetic force that is generated between the magnetic field generator 6 and the coils 7 by exciting the coils 7.

In the following description of the outer tube 2 and its related elements, an open end into which the inner tube 3 is inserted is referred to as an extreme end and an opposite end is referred to as a proximal end. Similarly, in the description of the inner tube 3 and its related elements, an open end inserted into the outer tube 2 is referred to as an extreme end and an opposite end is referred to as a proximal end.

Respective elements of the linear actuator 1 will be described in detail below.

The outer tube 2 has a cylindrical base portion 11 and a cylindrical inner portion 12 which is joined to the base portion 11.

The base portion 11 is formed in such a way that an inner surface of a proximal end of the base portion 11 along which the rod guide 5 slides has a smaller diameter as compared to an inner surface of an extreme end into which the inner portion 12 is inserted. The base portion 11 has a guide sliding part 11a in which the rod guide 5 is inserted so as to be free to slide and a fitting part 11b connected to the guide sliding part 11a in an axial direction thereof, the fitting part 11b having a larger diameter than the guide sliding part 11a. A screw part 11c is formed on an inner surface of an extreme end of the fitting part 11b. The inner portion 12 is screwed into the screw part 11c.

The inner portion 12 is an element which is screwed into the extreme end of the fitting part 11b, the inner portion 12 having an inner surface along which the inner tube 3 slides. The inner portion 12 has a bearing fitting part 12b formed on an inner surface of an extreme end portion thereof in which the inner tube 3 is inserted and a seal fitting part 12c. The seal fitting part 12c is formed on an extreme end side of the bearing fitting part 12b. A bearing 13 serving as an annular first bearing which slides along an outer peripheral surface of the inner tube 3 is provided in the bearing fitting part 12b. An annular dynamic seal 14 which slides along the outer peripheral surface of the inner tube 3 is provided in the seal fitting part 12c.

At a proximal end of the inner portion 12, there is formed a screw part 12a which is screwed into the screw part 11c on the inner surface of the base portion 11. The inner portion 12 is joined integrally with the base portion 11 as the screw part 12a is screwed into the screw part 11c.

The plurality of coils 7 which are arranged along the axial direction are retained on an inner surface of the coil holder 15. The coils 7 are held by the outer tube 2 via the coil holder 15. The coils 7 are so disposed as to surround an outer peripheral surface of the rod 4 and face the permanent magnets 6a provided in the rod 4. A total of six coils 7 are provided, two of each serving for U, V and W phases. The coils 7 are arranged in the order of the U, V and W phases.

Phase of current supplied to each phase of the coils 7 is switched on the basis of electrical angles with respect to the magnetic field generator 6 and the magnitudes of currents are regulated by pulse width modulation (PWM) control, whereby the magnitude of the thrust generated by the linear actuator 1 and a direction of the thrust are controlled. The number of the coils 7 is set to a value suited to the thrust generated by the linear actuator 1 and a pattern of electrical current supply.

Also, when an external force is exerted on the linear actuator 1 which causes the outer tube 2 and the inner tube 3 to be relatively displaced along the axial direction, there is generated a force that damps the relative displacement caused by the external force as a result of energizing current supply to the coils 7 or an induced electromotive force generated in the coils 7. This serves to damp vibrations or displacement of various devices caused by the external force exerted on the linear actuator 1.

The coil holder 15 has a cylindrical coil holding portion 15a retaining the coils 7 within an inner surface, a flange portion 15b joined directly to a proximal end of the coil holding portion 15a along the axial direction, and a conducting hole 15c passing through the flange portion 15b along the axial direction.

The coil holding portion 15a is inserted in an annular space 21 formed between the rod 4 and the inner tube 3.

Provided within the flange portion 15b is a magnetic sensor 16 which serves as a position sensor for detecting the position of the rod 4 along a stroke thereof. The magnetic sensor 16 detects the position of the magnetic field generator 6 relative to the coils 7 by sensing magnetism of the permanent magnets 6a.

The magnetic sensor 16 and the coils 7 are assembled in the coil holder 15, together forming a cartridge-like structure. This makes it possible to easily incorporate the magnetic sensor 16 and the coils 7 in the outer tube 2.

The flange portion 15b is sandwiched between the base portion 11 and the inner portion 12 and thereby fixed to the outer tube 2. Specifically, the flange portion 15b is first fitted in the fitting part 11b of the base portion 11. The screw part 12a of the inner portion 12 is then screwed into the screw part 11c of the base portion 11. As a result, the flange portion 15b is sandwiched between a stepped stage 11d of the base portion 11 and an extreme end 12d of the inner portion 12.

The inner tube 3 has an extreme end that is inserted into the outer tube 2 and the inner tube 3 is thereby maintained in state where it can move forward into and backward from the outer tube 2. An opening is formed at the extreme end of the inner tube 3. Specifically, the inner tube 3 is inserted into an annular space formed between the inner portion 12 of the outer tube 2 and the coil holder 15.

There is formed a bearing fitting part 3c on the outer peripheral surface of the extreme end of the inner tube 3. A bearing 17 serving as a second bearing which slides along the inner surface of the outer tube 2 is provided in the bearing fitting part 3c. The inner tube 3 is inserted into the outer tube 2 and supported by the bearing 13 and the bearing 17 such that the inner tube 3 can freely slide with respect to the outer tube 2. A result of this arrangement is that a bending moment caused by a lateral force exerted on the linear actuator 1 is supported by the outer tube 2 and the inner tube 3.

There is formed a conducting hole 3b interconnecting an air gap 20 formed between the inner tube 3 and the outer tube 2 and an internal space of the inner tube 3 on a side of the inner tube 3 in the vicinity of the bearing 17. The provision of the conducting hole 3b prevents the air gap 20 from being completely closed off. This arrangement serves to prevent such a situation that a smooth extending or contracting action of the linear actuator 1 is hindered by variations in pressure in the air gap 20 which may occur during extension or contraction of the linear actuator 1.

The proximal end of the rod 4 is joined to the bottom portion 3a of the inner tube 3 at a proximal end thereof. The extreme end of the rod 4 projects out from the opening in the extreme end of the inner tube 3 and reaches the guide sliding part 11a of the base portion 11 of the outer tube 2.

The rod 4 is erected at a central axis part of the inner tube 3, thereby forming the annular space 21 between the rod 4 the and inner tube 3. The rod 4 comprises a cylinder portion 4a accommodating the permanent magnets 6a in an internal space, a plug 4b which closes one open end of the cylinder portion 4a and a plug 4c which closes the other open end of the cylinder portion 4a. The plug 4b is joined to the bottom portion 3a of the inner tube 3 while the plug 4c is joined to the rod guide 5.

The plurality of rod-shaped permanent magnets 6a arranged along the axial direction are accommodated within the cylinder portion 4a. As the permanent magnets 6a are thus accommodated in the cylinder portion 4a, the permanent magnets 6a are retained by the rod 4. In this embodiment, the permanent magnets 6a are magnetized such that north (N) and south (S) poles are located along the axial direction. Any adjacent ones of the permanent magnets 6a accommodated within the rod 4 are arranged along the axial direction in such a manner that magnetic poles of the same polarity are oriented to face each other.

The rod 4 passes through the coil holder 15. This arrangement causes the permanent magnets 6a to face the coils 7 held on the inner surface of the coil holder 15. When inserted into the annular space 21 formed between the inner tube 3 and the rod 4, the coil holder 15 causes the permanent magnets 6a to face the coils 7. The permanent magnets 6a retained in the rod 4 produce magnetic fields that act on the coils 7. The permanent magnets 6a together constitute the magnetic field generator 6 of the linear actuator 1.

If the cylinder portion 4a is made of a ferromagnetic material, magnetic flux may concentrate within the cylinder portion 4a, potentially causing a risk of influencing magnetic flux in an outer peripheral area of the permanent magnets 6a. Thus, the cylinder portion 4a is made of a nonmagnetic material. Although the six permanent magnets 6a are provided in the rod 4, the number of the permanent magnets 6a may be determined depending on a required driving force of the linear actuator 1. In other words, the number of the permanent magnets 6a may be two or more.

In this embodiment, the rod 4 is constructed to have a hollow internal space for accommodating the permanent magnets 6a. However, the rod 4 is not limited to this structure but may be constructed into a columnar shape and the ring-shaped permanent magnets 6a may be mounted on an outer peripheral surface of the rod 4. In a case where the permanent magnets 6a are ring-shaped, the permanent magnets 6a may be formed such that the N and S poles are located along the axial direction or the permanent magnets 6a may be magnetized such that the permanent magnets 6a are polarized along inward and outward directions. That is to say, it is only required that the permanent magnets 6a be configured such that the N and S poles are alternately disposed along the axial direction of the rod 4.

It should be noted that, in this embodiment, a disk-shaped yoke 18 is placed between one permanent magnet 6a and an adjacent permanent magnet. The yokes 18 make it possible to efficiently produce the magnetic fields in an outer peripheral area of the rod 4.

The rod guide 5 fixed to the plug 4c provided at the other end of the rod 4 is formed into a disklike shape. Mounted on an outer peripheral surface of the rod guide 5 is a dynamic seal 19 that slides along an inner surface of the guide sliding part 11a of the base portion 11 of the outer tube 2. The rod guide 5 is inserted in the guide sliding part 11a of the outer tube 2 with the dynamic seal 19 placed in between. The rod 4 is guided by the rod guide 5 so that an axis of the rod 4 would not swing with respect to the outer tube 2.

The plug 4b provided at the proximal end of the rod 4 is joined to the bottom portion 3a of the inner tube 3. The inner tube 3 is positioned along radial directions within the outer tube 2 by the bearing 13 and the bearing 17 so that an axis of the inner tube 3 would not swing with respect to the outer tube 2. Thus, the rod 4 is positioned along the radial directions relative to the outer tube 2 and the inner tube 3 so that an axis of the rod 4 would not swing with respect to both.

Also, the coils 7 are retained by the outer tube 2 and positioned along the radial directions. Thus, the coils 7 and the magnetic field generator 6 are configured so that both axes do not swing with respect to each other. Therefore, the linear actuator 1 can perform smooth extending and contracting actions.

A gap between the outer tube 2 and the inner tube 3 is sealed by the dynamic seal 14. Also, a gap between the outer tube 2 and the rod guide 5 is sealed by the dynamic seal 19. Thus, an internal space of the linear actuator 1 is kept in a sealed state by the dynamic seal 14 and the dynamic seal 19.

Referring to FIG. 2(A), in a contracting stroke in which the inner tube 3 penetrates the outer tube 2, the linear actuator 1 can continue the stroke until an extreme end of the bearing fitting part 3c of the inner tube 3 comes into contact with the flange portion 15b of the coil holder 15. The flange portion 15b thus functions as a stopper for restricting the stroke of the linear actuator 1.

Referring to FIG. 2(B), in an extending stroke in which the inner tube 3 moves backward from the outer tube 2, the linear actuator 1 can continue the stroke until the bearing fitting part 3c of the inner tube 3 and the bearing fitting part 12b of the outer tube 2 come into contact with each other.

The extending stroke when the linear actuator 1 is most extended may be restricted by causing the rod guide 5 and the flange portion 15b to come into contact with each other. Also, there may be provided a cushion or the like between elements which comes into contact with each other when the stroke is limited to alleviate an impact caused by contact action produced at the time of restricting the stroke. The rod guide 5 slides along the inner surface of the guide sliding part 11a of the outer tube 2 within a predetermined slide range as a result of the extending or contracting action of the linear actuator 1.

As shown in FIG. 1, the air gap 20 between the outer tube 2 and the inner tube 3 is connected to the internal space of the inner tube 3 via the conducting hole 3b. Also, the air gap 20 is connected to the annular space 21 between the inner tube 3 and the rod 4, a space 22 formed between the outer tube 2 and the coil holder 15, and a space 23 formed by the outer tube 2 and the rod guide 5.

This means that the air gap 20, the annular space 21, the space 22 and the space 23 formed within the linear actuator 1 are connected to one another. The internal volumetric capacity of each of the air gap 20, the annular space 21, the space 22 and the space 23 varies with the stroke of the linear actuator 1.

Here, the cross-sectional area of an outer periphery of the inner tube 3 that slides along the outer tube 2 is made equal to the cross-sectional area of an inner periphery of the outer tube 2 that slides along the rod guide 5. The cross-sectional area of the outer periphery of the inner tube 3 represents a cross sectional area of the inner tube 3, which is perpendicular to a central axis of the inner tube 3. The cross-sectional area of the inner periphery of the outer tube 2 represents a cross-sectional area of an inner space of the outer tube 2, which is perpendicular to a central axis of the outer tube 2.

It should be noted that, although the slidable range in which the rod guide 5 can slide is formed over the entire length of the guide sliding part 11a so as not to create an ineffectual portion in the entire length of the outer tube 2 in the case of this embodiment, there may be provided a range in which the rod guide 5 does not slide when the linear actuator 1 makes a maximum stroke. In this case, the inner periphery of the outer tube 2 within the range in which the rod guide 5 does not slide may not necessarily be formed to have the same cross-sectional area as the outer periphery of the inner tube 3.

When the rod 4 makes a stroke, shifting from a state in which the linear actuator 1 is most contracted as shown in FIG. 2(A) to a state in which the linear actuator 1 is most extended as shown in FIG. 2(B), the volumetric capacity of the air gap 20 and that of the space 23 gradually decrease as a result of the stroke while volumetric capacities of the annular space 21 and the space 22 increase by the same amount.

Specifically, when the rod 4 extends from the contracted state, the volumetric capacity of the air gap 20 decreases. The volumetric capacity of the air gap 20 decreases by an amount 31 of reduction shown in FIG. 2(A). This amount 31 of reduction is equal to the volume of an amount 33 of increase among the entire amount of increase by which the volumetric capacity of the space 22 is increased as shown in FIG. 2(B).

Also, when the rod 4 extends from the contracted state, the volumetric capacity of the space 23 decreases. The volumetric capacity of the space 23 decreases by an amount 32 of reduction shown in FIG. 2(A). This amount 32 of reduction is equal to the total volume of an amount 34 of increase in the volumetric capacity of the annular space 21 and an amount 35 of increase among the entire amount of increase by which the volumetric capacity of the space 22 is increased as shown in FIG. 2(B).

The cross-sectional area of the outer periphery of the inner tube 3 is made equal to the cross-sectional area of the inner periphery of the outer tube 2 as mentioned above. Consequently, when the rod 4 of the linear actuator 1 makes a stroke in a direction to cause the volumetric capacities of the air gap 20 and the space 23 to decrease, the volumetric capacities of the annular space 21 and the space 22 increase by the same amount of reduction in the volumetric capacities of the air gap 20 and the space 23. When the rod 4 makes a stroke in a direction to cause the volumetric capacities of the annular space 21 and the space 22 to decrease, on the other hand, the volumetric capacities of the air gap 20 and the space 23 increase by the same amount of reduction in the volumetric capacities of the annular space 21 and the space 22. Therefore, even when the rod 4 makes a stroke in the linear actuator 1, the internal volumetric capacity of the linear actuator 1 does not vary irrespective of a stroke direction and amount.

Since the internal volumetric capacity does not vary even when the linear actuator 1 extends or contracts as discussed above, an internal pressure remains unchanged. It is therefore possible to reliably prevent foreign matter from being sucked into the internal space of the linear actuator 1.

According to this embodiment, as the outer peripheral surface of the inner tube 3 along which the outer tube 2 slides and the inner surface of the outer tube 2 along which the rod guide 5 slides have the same cross-sectional area, both are formed into a circular shape having the same diameter. However, the shape of the cross-section may be one that is different from a circular shape as long as the same cross-sectional area is maintained.

The annular space 21 and the space 23 are connected to each other via a ring-shaped gap formed between the rod 4 and the coil holder 15. It is advantageous in terms of increasing the thrust of the linear actuator 1 if this ring-shaped gap is made as small as possible. If this gap is made small, however, the gap will present resistance to a flow of gas between the annular space 21 and the space 23, potentially causing a risk of generating a damping force that acts against the stroke of the rod 4.

To cope with this problem, according to this embodiment, the conducting hole 15c having a cross-sectional area that will not impede the flow of gas is formed through the flange portion 15b of the coil holder 15 to interconnect the annular space 21 and the space 23. As a result, it is possible to prevent the generation of the damping force that acts against the stroke of the rod 4.

Consequently, the provision of the conducting hole 15c allows a reduction in the gap between the rod 4 and the coil holder 15 and, therefore, it is possible to suppress the generation of the damping force and increase a maximum thrust of the linear actuator 1.

The linear actuator 1 according to this embodiment is so structured as to bear the bending moment caused by the lateral force exerted on the linear actuator 1 by the outer tube 2 and the inner tube 3. Accordingly, a situation in which an excessive bending moment acts on the rod 4 can be avoided, thereby preventing the permanent magnets 6a held by the rod 4 from undergoing an excessive stress.

The coils 7 are held by the cylindrical coil holder 15 which is fixed to the outer tube 2 via the flange portion 15b. Accordingly, a situation in which an excessive bending moment acts on the coils 7 can be avoided, thereby preventing the coils 7 from coming off the coil holder 15 or undergoing a breakage.

The above-described embodiment produces the following advantages.

According to this embodiment, the outer peripheral surface of the inner tube 3 along which the outer tube 2 slides and the inner surface of the outer tube 2 along which the rod guide 5 slides are formed to have the same cross-sectional area. For this reason, even when the rod 4 makes a stroke in the linear actuator 1, the internal volumetric capacity of the linear actuator 1 does not vary. Thus, the internal pressure of the linear actuator 1 does not vary. Therefore, it is possible to prevent intrusion of foreign matter into the internal space of the linear actuator 1.

Although the invention has been described above with reference to certain embodiments, the invention is not limited to the embodiments described above. Modifications and variations of the embodiments described above will occur to those skilled in the art, within the scope of the claims.

The contents of application No. 2010-210453, with a filing date of Sep. 21, 2010 in Japan, are hereby incorporated by reference.

The embodiments of this invention in which an exclusive property or privilege is claimed are defined as follows:

The invention claimed is:

1. A linear actuator comprising an outer tube and an inner tube inserted in the outer tube, the linear actuator generating a thrust for relatively displacing the outer tube and the inner tube along an axial direction; further comprising:
   a rod erected at a central axis part of the inner tube and forming an annular space between the rod and the inner tube;
   a rod guide provided at an extreme end of the rod in sliding contact with an inner surface of the outer tube;
   a plurality of permanent magnets arranged along the axial direction in the rod; and
   a plurality of coils retained by the outer tube so as to face the permanent magnets;
   wherein a cross-sectional area of an outer periphery of the inner tube along which the outer tube slides and a cross-sectional area of an inner periphery of the outer tube along which the rod guide slides are set to be equal.

2. The linear actuator as defined in claim 1, wherein the outer periphery of the inner tube along which the outer tube slides is formed into a circular shape and the inner periphery of the outer tube along which the rod guide slides is formed into a circular shape having a diameter that is identical to a diameter of the outer periphery of the inner tube.

3. The linear actuator as defined in claim 1, further comprising:
   a first bearing that is provided in an inner surface of an end portion of the outer tube, in which the inner tube is inserted, and slides along the outer periphery of the inner tube;
   an annular second bearing that is provided on an outer peripheral surface of an open end of the inner tube and slides along the inner periphery of the outer tube; and
   a conducting hole interconnecting an annular air gap formed between the inner tube and the outer tube and an internal space of the inner tube.

4. The linear actuator as defined in claim 1, further comprising:
   a cylindrical coil holder which is inserted in the annular space formed between the rod and the inner tube and retains the coils,
   wherein the coil holder comprises:
   a coil holding portion retaining the coils within an inner surface; and
   a flange portion joined directly to the coil holding portion along an axial direction thereof and fixed to the outer tube.

5. The linear actuator as defined in claim 4, wherein the outer tube comprises:
   a cylindrical base portion having a guide sliding part into which the rod guide is inserted so as to be free to slide and a fitting part which is joined directly to the guide sliding part along an axial direction thereof with the flange portion fitted in the fitting part; and
   a cylindrical inner portion which is screwed into an end portion of the fitting part, the inner portion having an inner surface along which the inner tube slides;

wherein the coil holder is fixed to the outer tube with the flange portion sandwiched between the base portion and the inner portion.

6. The linear actuator as defined in claim 4, wherein the coil holder has a conducting hole passing through the flange portion along the axial direction.

7. The linear actuator as defined in claim 4, wherein the coil holder comprises a position sensor provided at the flange portion for detecting a stroke position of the rod.

* * * * *